(12) United States Patent
Choi et al.

(10) Patent No.: US 12,358,582 B2
(45) Date of Patent: Jul. 15, 2025

(54) RACK FOR BOTH BICYCLE AND KICK SCOOTER

(71) Applicant: INDUSTRY-UNIVERSITY COOPERATION FOUNDATION HANYANG UNIVERSITY ERICA CAMPUS, Ansan-si (KR)

(72) Inventors: Joon-Myung Choi, Seongnam-si (KR); Soung-Bin Gwak, Busan (KR); Min-Jung Kwon, Seoul (KR)

(73) Assignee: Industry-University Cooperation Foundation Hanyang University Erica Campus, Ansan-si (KR)

( * ) Notice: Subject to any disclaimer, the term of this patent is extended or adjusted under 35 U.S.C. 154(b) by 156 days.

(21) Appl. No.: 18/030,874

(22) PCT Filed: Nov. 17, 2020

(86) PCT No.: PCT/KR2020/016115
§ 371 (c)(1),
(2) Date: Jan. 3, 2024

(87) PCT Pub. No.: WO2022/075515
PCT Pub. Date: Apr. 14, 2022

(65) Prior Publication Data
US 2024/0124080 A1 Apr. 18, 2024

(30) Foreign Application Priority Data

Oct. 8, 2020 (KR) .................. 10-2020-0130321
Nov. 13, 2020 (KR) .................. 10-2020-0152099

(51) Int. Cl.
*B62H 3/04* (2006.01)

(52) U.S. Cl.
CPC .................. *B62H 3/04* (2013.01)

(58) Field of Classification Search
CPC . B62H 3/00; B62H 3/005; B62H 3/04; B62H 3/06; B62H 3/08; B62H 3/10; B62H 2700/00
See application file for complete search history.

(56) References Cited

U.S. PATENT DOCUMENTS

| | | | | |
|---|---|---|---|---|
| 4,399,893 A | * | 8/1983 | Switzer ............... | B60T 3/00 70/226 |
| 4,437,597 A | * | 3/1984 | Doyle ............... | B60R 9/10 211/23 |

(Continued)

FOREIGN PATENT DOCUMENTS

| | | | |
|---|---|---|---|
| CN | 2820661 Y | 9/2006 | |
| DE | 202024101503 U1 * | 6/2024 | ............... B62H 3/08 |

(Continued)

*Primary Examiner* — Patrick D Hawn
(74) *Attorney, Agent, or Firm* — NSIP Law

(57) ABSTRACT

Provided is a rack for a bicycle or a kick scooter that is a single device allowing either of a bicycle or a kick scooter to be parked. The rack includes a pair of support members formed to extend upward from the ground and disposed to be parallel with and spaced apart from each other, a rotating shaft coupled to the support members, a parking member interposed between the pair of support members and axially coupled to the rotating shaft so as to be rotatable, and a protruding member disposed to be spaced apart from a front of the parking member that faces the bicycle or the kick scooter and having both ends bent toward the parking member to be fixed to the parking member.

7 Claims, 7 Drawing Sheets

(56) References Cited

U.S. PATENT DOCUMENTS

| | | | |
|---|---|---|---|
| 6,575,310 B2 * | 6/2003 | Chamoun | B66F 7/243 211/20 |
| 6,640,979 B1 | 11/2003 | Mayfield | |
| 6,755,309 B1 * | 6/2004 | Runge | B62H 3/04 211/183 |
| 7,150,359 B1 * | 12/2006 | Lyons | B62H 3/08 211/20 |
| 7,958,973 B2 * | 6/2011 | Swasand | B60T 3/00 188/32 |
| 8,104,588 B2 * | 1/2012 | Curlee | B62H 3/08 211/20 |
| 8,413,820 B2 * | 4/2013 | Steadman | B62H 3/06 211/21 |
| 8,662,803 B2 * | 3/2014 | Bowman | B60P 3/075 410/9 |
| 9,610,993 B1 * | 4/2017 | Ho | B62H 3/06 |
| 9,650,092 B1 * | 5/2017 | Tsai | B62H 3/08 |
| 10,525,897 B2 * | 1/2020 | Lathrop | B62H 3/08 |
| 10,618,582 B1 * | 4/2020 | Liu | B62H 3/06 |
| 10,787,130 B2 * | 9/2020 | Nordström | B60R 9/048 |
| 11,505,267 B1 * | 11/2022 | Gu | B62H 3/04 |
| 11,780,518 B1 * | 10/2023 | Ho | B62H 3/06 211/19 |
| 11,839,966 B1 * | 12/2023 | Helmrich | B25H 1/0014 |
| 2005/0047887 A1 * | 3/2005 | Kenny | B60P 3/077 410/30 |

FOREIGN PATENT DOCUMENTS

| | | | | |
|---|---|---|---|---|
| JP | 11-141164 A | | 5/1999 | |
| KR | 20-0189425 Y1 | | 7/2000 | |
| KR | 20-0202899 Y1 | | 11/2000 | |
| KR | 10-0923247 B1 | | 10/2009 | |
| KR | 200449359 Y1 | * | 7/2010 | B62H 3/12 |
| KR | 20100113311 A | * | 10/2010 | E04H 6/10 |
| KR | 10-1078815 B1 | | 11/2011 | |
| KR | 10-1150821 B1 | | 6/2012 | |
| KR | 10-2079207 B1 | | 2/2020 | |

* cited by examiner

[FIG.1]
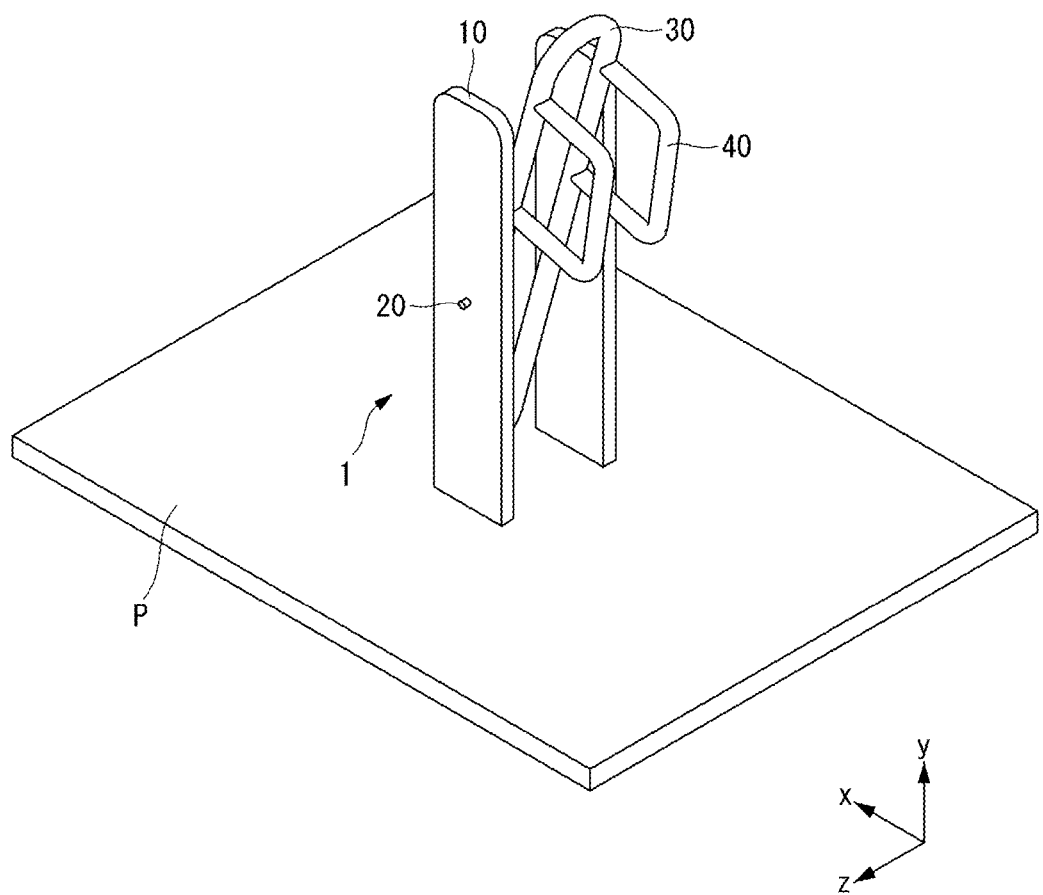

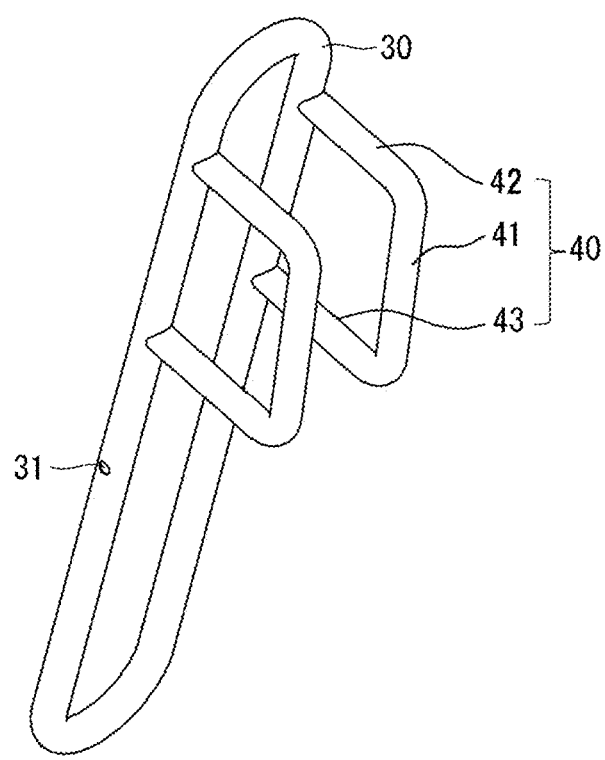

[FIG.3]
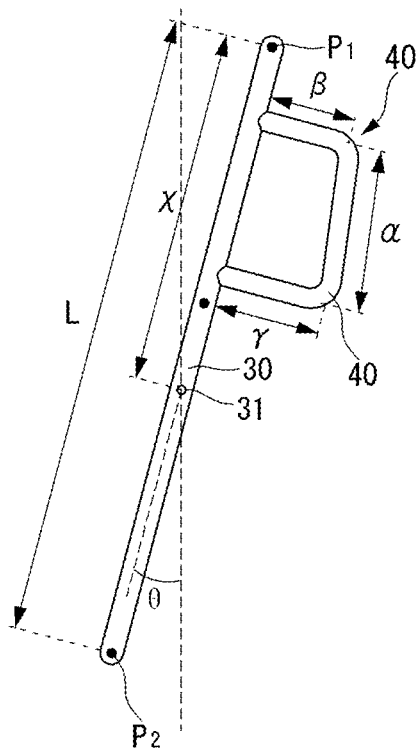
[FIG.4]
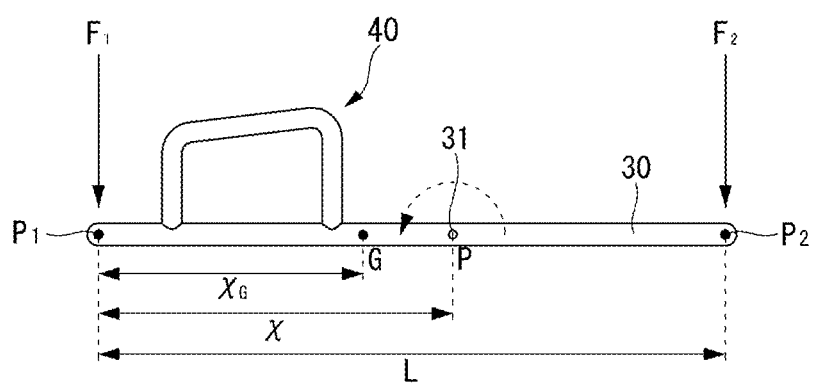

[FIG.5]
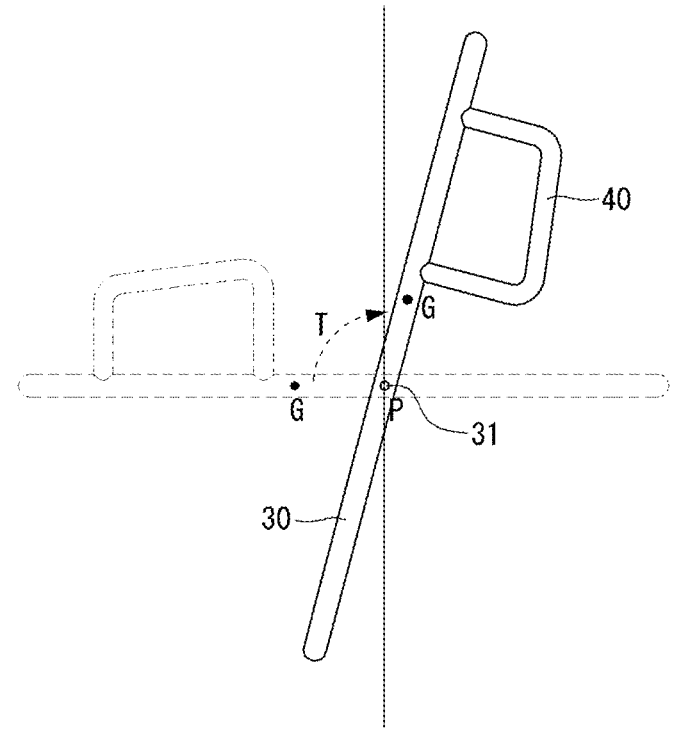
[FIG.6]
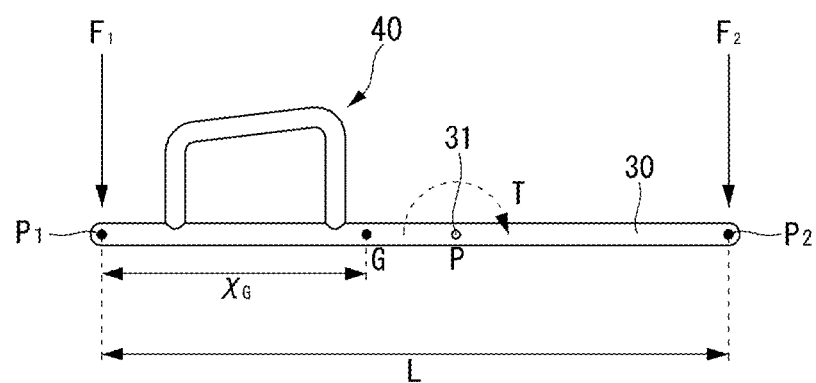

[FIG.7A]
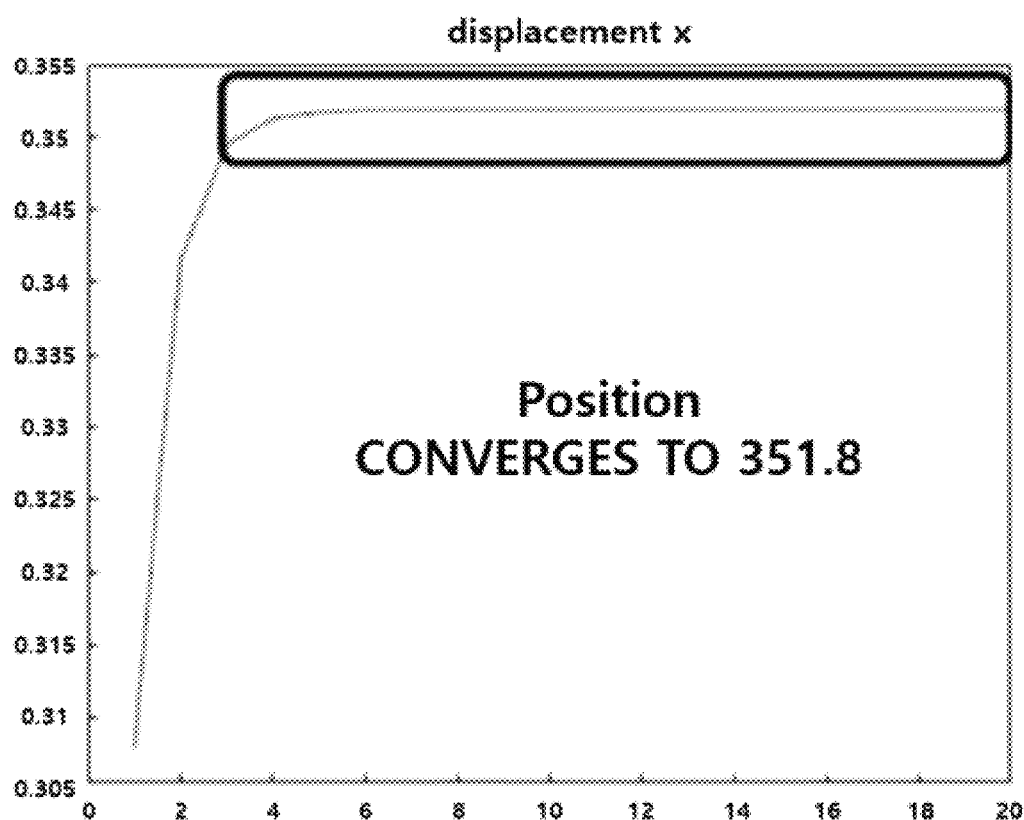

[FIG.7B]
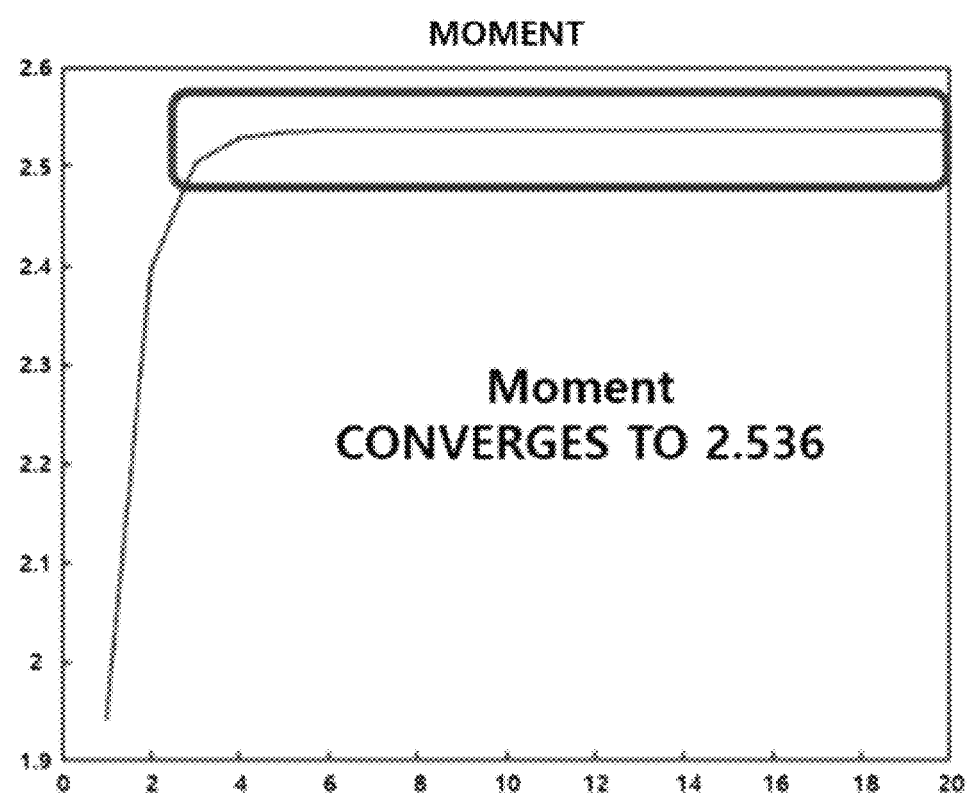

【FIG.8A】
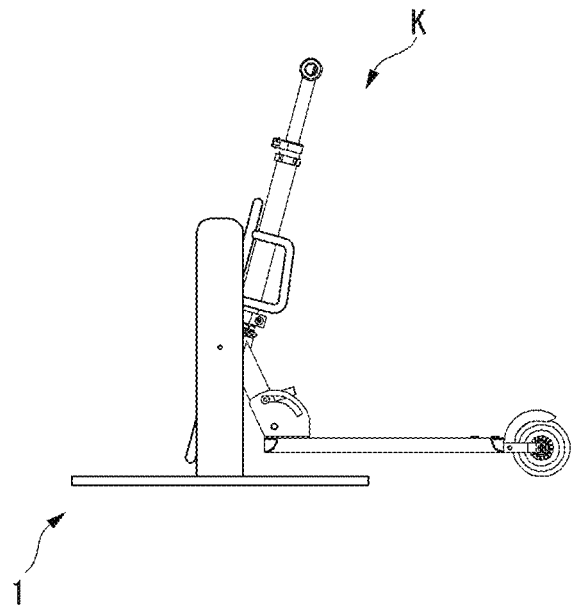
【FIG.8B】
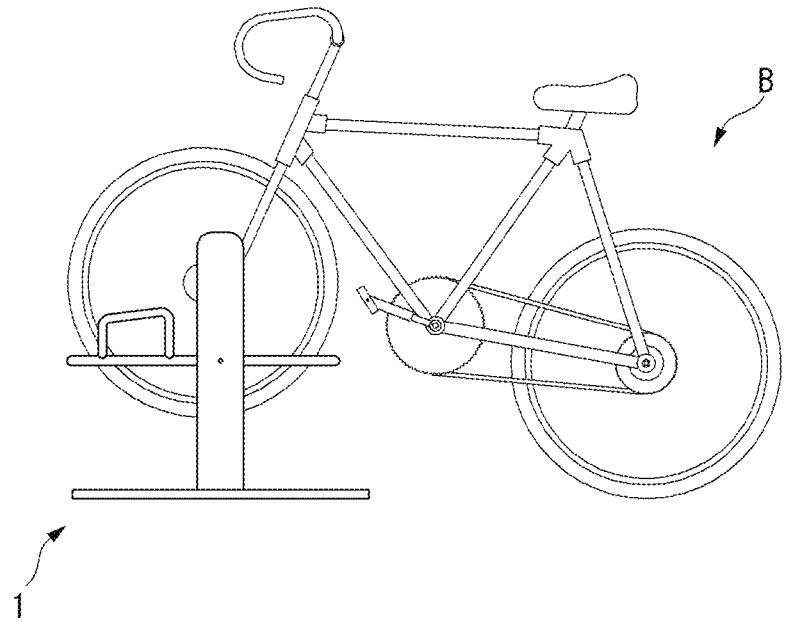

RACK FOR BOTH BICYCLE AND KICK SCOOTER

CROSS REFERENCE TO RELATED APPLICATIONS

This application is a U.S. National Stage Application of International Application No. PCT/KR2020/016115, filed on Nov. 17, 2020, which claims the benefit under 35 USC 119(a) and 365(b) of Korean Patent Application No. 10-2020-0130321, filed on Oct. 8, 2020, and No. 10-2020-0152099, filed on Nov. 13, 2020 in the Korean Intellectual Property Office, the entire disclosure of which is incorporated herein by reference for all purposes.

BACKGROUND

1. Field of the Invention

The present disclosure relates to a rack for a bicycle or a kick scooter, and more particularly, to a rack for a bicycle or a kick scooter that is a single device allowing either of a bicycle or a kick scooter to be parked.

2. Discussion of Related Art

The conventional public racks allow only bicycles to be parked. However, the gradual growth of the market for electric kick scooters, centered on large cities, has caused a problem that, while spots are available in bicycle racks, electric kick scooters are parked on the street rather than in a dedicated space, which is absolutely illegal and obstructs the path of pedestrians.

There is a problem that electric kick scooters are vulnerable to theft but cannot be parked in the existing bicycle racks, thus reducing space efficiency. Despite space being available in bicycle racks, there is no space left due to the existing bicycle racks installed in advance, and electric kick scooters have to be parked in other spaces. Consequently, the problem of a double waste of space may occur. Also, an electric kick scooter stands in one direction, which makes the electric kick scooter vulnerable to force applied in the opposite direction, and thus there is a problem that the electric kick scooter cannot be stored in the conventional bicycle rack. Further, unlike bicycles which are standardized, electric kick scooters greatly differ for each model in height and width of wheels and handles, and the existing patents related to electric kick scooters only allow specific kick scooters to be parked.

Therefore, a rack for a bicycle or a kick scooter that enables both the parking of a bicycle and the parking of a kick scooter is needed to address the above problems.

SUMMARY OF THE INVENTION

The present disclosure is directed to providing a rack for a bicycle or a kick scooter that is a single device allowing either of a bicycle or a kick scooter to be parked.

According to the present disclosure, a rack for a bicycle or a kick scooter includes a pair of support members formed to extend upward from the ground and disposed to be parallel with and spaced apart from each other, a rotating shaft coupled to the support members, a parking member interposed between the pair of support members and axially coupled to the rotating shaft so as to be rotatable, and a protruding member disposed to be spaced apart from a front of the parking member that faces the bicycle or the kick scooter and having both ends bent toward the parking member to be fixed to the parking member.

The rack may further include an elastic member configured to apply an elastic force to the parking member to allow the parking member to move to a preset reference position.

The elastic member may have elasticity that allows the parking member to rotate to a preset parking position in a case in which the bicycle is parked in the parking member.

The elastic member may provide an elastic force to the parking member so that the parking member rotates to the reference position at which the parking member is tilted toward the front from a central axis perpendicular to the ground.

The parking member may maintain a tilt of 7° toward the front from the central axis due to the elastic member.

A center of mass of the parking member may be formed between the rotating shaft and the protruding member.

The rack may further include a stopper fixed to the rotating shaft to limit a radius of rotation of the parking member.

The parking member may be formed to have a length in a range of 450 mm to 800 mm.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 is a perspective view of a rack for a bicycle or a kick scooter according to one embodiment of the present disclosure;

FIG. 2 is a perspective view of a parking member of FIG. 1;

FIG. 3 is a lateral view of the parking member of FIG. 2;

FIGS. 4 to 6 are operation diagrams of the parking member;

FIGS. 7A and 7B are convergence plots for setting the moment of an elastic member and the position of a rotating shaft; and FIGS. 8A and 8B are use state diagrams of the rack for a bicycle or a kick scooter according to the present disclosure.

DETAILED DESCRIPTION OF EXEMPLARY EMBODIMENTS

Advantages and features of the present disclosure and methods of achieving the same will become apparent from the embodiments described in detail below with reference to the accompanying drawings. However, the present disclosure is not limited to the embodiments disclosed below and may be implemented in various different forms. The embodiments herein are provided to make the disclosure complete and to completely inform those of ordinary skill in the art to which the present disclosure pertains of the scope of the disclosure, and the present disclosure is defined only by the claims. Like reference numerals refer to like components throughout the specification.

In the present specification, a "front" refers to where a parking member faces a bicycle or a kick scooter, and a "rear" refers to a direction opposite to the "front." Specifically, based on FIG. 1, the "front" may indicate the negative x-axis direction, and the "rear" may indicate the positive x-axis direction.

Hereinafter, a rack 1 for a bicycle or a kick scooter according to one embodiment of the present disclosure will be described in detail with reference to the drawings.

The rack 1 for a bicycle or a kick scooter according to the present disclosure that enables parking and storage of both a bicycle and a kick scooter will be described. The rack 1 for a bicycle or a kick scooter according to the present disclosure has a parking member 30 that is rotatable and thus can allow a kick scooter K to be parked when the parking member 30 is placed to stand at an angle close to vertical and can allow a front wheel of a bicycle B to be parked and stored in the parking member 30 when the parking member 30 is rotated to an angle almost parallel to the ground. In particular, the present disclosure includes a protruding member 40 formed to protrude from a surface of the parking member 30 that faces the bicycle or kick scooter and thus, when the bicycle B or the kick scooter K is parked, can prevent the bicycle B or the kick scooter K from tilting or falling down and allow the bicycle B or the kick scooter K to be stably parked.

In the present disclosure, the parking member 30 configured to allow the bicycle B or the kick scooter K to be parked therein is formed to have a rotatable structure and maintains a vertically placed state when the bicycle B is not parked therein. In this way, the rack 1 is prevented from being placed to protrude outward when not in use, thus improving space utilization.

Hereinafter, the structure of the rack 1 for a bicycle or a kick scooter according to the present disclosure will be described in detail.

The structure of the rack 1 for a bicycle or a kick scooter according to the present disclosure will be described in detail with reference to FIGS. 1 to 3.

FIG. 1 is a perspective view of the rack 1 for a bicycle or a kick scooter according to one embodiment of the present disclosure, FIG. 2 is a perspective view of the parking member 30 of FIG. 1, and FIG. 3 is a lateral view of the parking member 30 of FIG. 2.

The rack 1 for a bicycle or a kick scooter according to the present disclosure includes a support member 10, a rotating shaft 20, the parking member 30, and the protruding member 40. Specifically, the rack 1 for a bicycle or a kick scooter includes a pair of support members 10 formed to extend upward from the ground and disposed to be parallel with and spaced apart from each other, the rotating shaft 20 coupled to the support members 10, the parking member 30 interposed between the pair of support members 10 and axially coupled to the rotating shaft 20 so as to be rotatable, and the protruding member 40 disposed to be spaced apart from a front of the parking member 30 that faces a bicycle or a kick scooter and having both ends bent toward the parking member 30 to be fixed to the parking member 30.

The support member 10 is for rotatably installing the parking member 30, which is configured to allow the bicycle B (see FIG. 8B) or the kick scooter K (see FIG. 8A) to be parked therein, on the ground and is provided as the pair of support members 10 formed to extend upward from the ground. The support member 10 may be formed in the shape of a thin, long stick or formed in the shape of a wide, flat board. The support member 10 may be made of a hard material whose stiffness is sufficient to support the bicycle B or the kick scooter K parked in the parking member 30. The pair of support member 10 formed as described above may be formed to extend from a support plate P seated on the ground as illustrated or may be disposed to be parallel with and spaced apart from each other on the ground without being formed to extend from the support plate P. The parking member 30 may be interposed between the pair of support members 10, and the rotating shaft 20 may be coupled to at least a portion of the support members 10.

The rotating shaft 20 is a central axis for rotatably coupling the parking member 30 to the pair of support members 10 and may be coupled to the support members 10 and rotatable. The rotating shaft 20 may be formed of a thin, long stick-shaped mechanical component and may be axially coupled to the support members 10 while being parallel to the ground. The rotating shaft 20 may be coupled to each of the pair of support members 10, be formed to extend in the direction parallel to the ground, and have both ends coupled to the pair of support members 10. However, the case in which the rotating shaft 20 is provided as a pair of rotating shafts 20 and each of the pair of rotating shafts 20 is coupled to one of the pair of support members 10 is described herein as an example.

A stopper (not illustrated), an elastic member (not illustrated), or the like may be coupled to an outer circumferential surface of the rotating shaft 20, and the stopper (not illustrated) and the elastic member (not illustrated) will be described in more detail below after describing the parking member 30. Further, the position at which the rotating shaft 20 is formed in the parking member 30 may appear to be a central portion in a longitudinal direction in which the parking member 30 is formed to extend. However, the position at which the rotating shaft 20 is formed in the parking member 30 may be set in consideration of various factors such as an elastic force of the elastic member and loads $F_1$ and $F_2$ of a bicycle that are applied to both ends $P_1$ and $P_2$ of the parking member 30 when the bicycle is parked in the parking member 30. A more detailed description will be given below with reference to FIGS. 4 to 6.

Referring to FIGS. 2 and 3, the parking member 30 is for stably parking a bicycle or a kick scooter and may be interposed between the pair of support members 10 and axially coupled to the rotating shaft 20 so as to be rotatable. The parking member 30 may include a pair of parking bars formed to be parallel with and spaced apart from each other, and both ends of the pair of parking bars facing each other may be formed to be connected to each other while being bent. For example, the parking member 30 may be formed in the shape of zero (0), but the present disclosure is not limited thereto, and the parking member 30 may be formed in various other shapes, such as a rectangular shape and a semicircular shape, as long as a bicycle or a kick scooter is able to be parked therein. In the parking member 30, a through-hole 31 may be formed in the parking bars in a direction perpendicular to the longitudinal direction, and the rotating shaft 20 may be coupled to the through-hole 31 and coupled to the support members 10.

In the parking member 30, a front tire of the bicycle B may be parked between the pair of parking bars. The pair of parking bars may be formed to be spaced apart at an interval sufficient for the front tire of the bicycle B to be parked and may have both ends, facing each other, formed to be connected to each other while being bent to allow the front tire of the bicycle B to be stably parked and supported. Further, the overall length L of the parking member 30 may be formed in a range that allows the bicycle B to be parked, and the case in which the overall length L of the parking member 30 is formed in a range of 450 mm to 800 mm is described herein as an example. By the overall length L of the parking member 30 being formed in the above range, users may stably park shared or personally-owned bicycles B that are commonly used.

The parking member 30 formed as described above may be coupled to the support members 10 and placed at a reference position. The reference position is a position at which the parking member 30 maintains a tilt of a predetermined angle due to an elastic force being applied from the elastic member, which will be described below, to the parking member 30. More specifically, the reference position is a preset position of the parking member 30 and is a position at which the parking member 30 maintains a tilt of 7° toward the front from the central axis perpendicular to the ground. 7° which is the angle at which the parking member 30 is tilted toward the front from the central axis may be defined as a reference angle. The central axis may refer to the axis perpendicular to the ground as illustrated in FIG. 3. Due to being tilted 7° toward the front, the parking member 30 may come in close contact with and fixed to the kick scooter K even when a separate external force is not applied thereto.

The elastic member is a type of torsion spring having elasticity that allows the parking member 30 to rotate to a preset parking position when the bicycle B is parked in the parking member 30. The elastic member is interposed between outer circumferential surfaces of the rotating shafts and has both ends fixed to the support members 10 and the stopper or the parking member 30. The elastic member may provide an elastic force to the parking member 30 to allow the parking member 30 to rotate to the reference position at which the parking member 30 is tilted toward the front from the central axis perpendicular to the ground. The parking member 30 may maintain a tilt of 7° toward the front from the central axis due to the elastic member. Further, by applying an elastic force to the parking member 30, the elastic member may move the parking member 30 to the reference position even when the parking member 30 rotates a predetermined angle due to an external force applied to one side surface of the parking member 30.

The center of mass of the parking member 30 may be formed between the rotating shaft 20 and the protruding member 40, but the present disclosure is not limited thereto, and the center of mass of the parking member 30 may be formed anywhere between the rotating shaft 20 and a first end point $P_1$ according to a change in the form, shape, material, and the like of the protruding member 40.

The protruding member 40 may be formed on the front of the parking member 30 where the front tire of the bicycle B is parked.

The protruding member 40 is for allowing the bicycle B or the kick scooter K to be stably parked and fixed and may be formed to protrude from the parking member 30. The protruding member 40 may be provided as a pair of protruding members 40 each of which is disposed to be spaced apart from the front of the parking member 30 facing the bicycle B or the kick scooter K and has both ends bent toward the parking member 30 to be fixed to the parking member 30. The protruding member 40 may include a stick portion 41 disposed to be spaced apart from the front of the parking member 30 facing the bicycle or the kick scooter, and a first bent portion 42 and a second bent portion 43 bent from both ends of the stick portion 41 to be fixed to the parking member 30. Here, the first bent portion 42 and the second bent portion 43 may each have one end formed to protrude from the parking member 30 and extend to be perpendicular to the parking member 30, and both ends of the stick portion 41 may be formed to be connected to the other end of the first bent portion 42 and the other end of the second bent portion 43 that are formed to be spaced apart from each other. The stick portion 41 may be formed to extend in the direction perpendicular to the ground.

Although the stick portion 41, the first bent portion 42, and the second bent portion 43, which are the components of the protruding member 40, are separately described herein for convenience of description, the stick portion 41, the first bent portion 42, and the second bent portion 43 may be integrally formed. Further, although the parking member 30 and the protruding member 40 are described herein as separate components, the parking member 30 and the protruding member 40 may either be separately formed or integrally formed or may be formed to be detachably coupled to each other.

The protruding member 40 may include the stick portion 41, the first bent portion 42, and the second bent portion 43 and may be formed in an angular U-like shape. Here, in the protruding member 40, the first bent portion 42 and the second bent portion 43 may be formed in different lengths to allow the stick portion 41 to be placed perpendicular to the ground. Referring to FIG. 3, the first bent portion 42 and the second bent portion 43 formed by both ends of the protruding member 40 being bent may be formed to have lengths different from each other. The length of the second bent portion 43 may be formed in consideration of the lengths of the first bent portion 42 and the stick portion 41, and a length γ of the second bent portion 43 may be formed as follows.

$$\gamma = \beta + \alpha \sin \theta \qquad \text{[Equation 1]}$$

In Equation 1, γ is the length of the second bent portion 43, β is the length of the first bent portion 42, α is the length of the stick portion 41, and θ is an angle between the parking member 30 and the central axis in a default state.

The default state refers to a state in which the parking member 30 is at the reference position which is the position at which the parking member 30 maintains a tilt of 7° from the central axis. Here, in the default state, the stick portion 41 is set to be perpendicular to the ground. Although the stick portion 41 is illustrated in FIG. 3 as being slightly tilted from the perpendicular to the ground, the case in which the stick portion 41 is formed perpendicular to the ground is described herein as an example. The value of θ refers to an average value of the angle at which the body of the kick scooter K is tilted from the central axis perpendicular to the ground that is obtained from research of the dimensions of electric kick scooters K of popular brands. The case in which the value of θ is 7° is described herein as an example.

Meanwhile, the rack 1 for a bicycle or a kick scooter may further include the stopper (not illustrated).

The stopper is for limiting a radius of rotation of the parking member and may be formed to be fixed to the rotating shaft 20. The stopper may prevent the parking member 30 from deviating from the reference position and may limit the parking member 30 to be placed within the reference angle. Due to the stopper, the parking member 30 may rotate within 7°, which is the angle at which the parking member 30 is tilted toward the front, from an angle close to vertical. 7° may be defined as an angle of limitation or a limit of the radius of rotation. Also, the stopper may allow the parking member 30 to rotate within a predetermined angle of limitation and may limit and prevent the parking member 30 from deviating from the angle of limitation and the reference position.

Hereinafter, the position at which the rotating shaft is formed in the parking member will be described in detail with reference to FIGS. 4 to 6. The position of the rotating shaft at which a bicycle can be parked when the elastic member is not taken into consideration and the position of the rotating shaft at which a bicycle can be parked in consideration of a condition of the elastic member for the bicycle to return to its original position will be described in detail with reference to FIGS. 4 to 6.

FIGS. 4 to 6 are views showing rotating operations of the parking member. FIG. 4 is a view for describing a condition for parking a bicycle in a state in which the parking member is horizontal without the elastic member, FIG. 5 is a view for describing a condition of the elastic member for the parking member to automatically return to its original position after the bicycle is removed, and FIG. 6 is a view for describing a condition in which the bicycle can be parked in the parking member in consideration of the elastic member.

When viewed in the z-axis direction based on FIG. 1, the parking member 30 should be rotated counterclockwise for a bicycle to be stably parked in the rack 1 for a bicycle or a kick scooter according to the present disclosure. The bicycle cannot be stably parked when the parking member 30 rotates clockwise. Accordingly, the moments in both directions based on the rotating shaft 20 may be set differently in the rack 1 for a bicycle or a kick scooter according to the present disclosure.

FIG. 4 is a view for describing a condition for enabling parking of a bicycle in a state in which the parking member is horizontal without a spring.

FIG. 4 illustrates a state in which the parking member 30 is rotated to an angle close to horizontal, the front tire of the bicycle B is parked in the parking member 30, and the loads $F_1$ and $F_2$ of the bicycle are applied to the parking member 30. The loads applied to the first end point $P_1$ and a second end point $P_2$ of the parking member 30 when the parking member 30 is rotated to the state close to horizontal from the state close to vertical and the front tire of the bicycle B is parked on the parking member 30 may be denoted by $F_1$ and $F_2$. The right-side moment and the left-side moment of the parking member 30 with respect to the rotating shaft 20 of FIG. 4 may be obtained as follows.

$$F_1 x + m(x - x_G) > F_2 (L - x) \quad \text{[Equation 2]}$$

In Equation 2, $F_1$ is the load of the bicycle B that is applied to $P_1$, $F_2$ is the load of the bicycle B that is applied to $P_2$, x is a distance from $P_1$ to the rotating shaft 20, m is the weight of the parking member 30, $x_G$ is a distance from $P_1$ to G, and L is the overall length of the parking member 30.

In the rack 1 for a bicycle or a kick scooter according to the present disclosure, the left-side moment of the parking member 30 is formed greater than the right-side moment thereof. The following equation may be obtained when it is assumed that the loads $F_1$ and $F_2$ of the bicycle are 19.30 and 24.85, the weight m of the parking member 30 (a value calculated through a program) is 13.58, the overall length L of the parking member 30 is 625, and the distance $x_G$ from the first end point $P_1$ to the center of mass G (a value calculated through a program) is 165.

$$19.30x + 13.58(x - 165) > 24.85(625 - x)$$

$$x \geq 307.87$$

By setting the length x from $P_1$ to the rotating shaft 20 to be 307.87 or greater as shown in the above equation, the bicycle B can be parked when a spring is not taken into consideration. Also, by setting the left-side moment to be greater than the right-side moment with respect to the rotating shaft 20, even without a spring, the parking member 30 can rotate counterclockwise and, in the horizontal state, stably support the front tire of the bicycle B.

FIG. 5 is a view for describing a condition of the elastic member for the parking member 30 to rotate to the reference position after the front tire of the bicycle parked in the parking member 30 is removed.

Referring to FIG. 5, after the front tire of the bicycle B is removed from the parking member 30 that has been maintaining an angle close to horizontal while the front tire of the bicycle B is parked therein, the parking member 30 may return to the reference position due to an elastic force of the elastic member. The moment of the elastic member for the parking member 30 to return to the reference position after an external force applied to the parking member 30 is removed is as follows.

$$m(x - x_G) < T \quad \text{[Equation 3]}$$

In Equation 3, m is the weight of the parking member 30, x is the distance from $P_1$ to the rotating shaft 20, $x_G$ is the distance from $P_1$ to G, and T is a value of torque.

That is, the elastic member serves to provide rotating torque of the parking member to allow the parking member to rotate to the reference position, and an elastic force of the elastic member may vary according to the distance between the center of mass and the center of rotation as shown in Equation 3 above.

However, in consideration of convenience in design, the position of the rotating shaft may be changed while the elastic force of the elastic member is kept unchanged. The value of torque T of the elastic member may start from a value close to 0 and increase proportional to the increase in the difference between the center of mass G of the parking member 30 and the position x of the rotating shaft 20. That is, the value of torque T is proportional to the value of x, and as the value of x converges, the value of torque T also converges. As an example, the distance from $P_1$ to the rotating shaft 20 may decrease with a decrease in the value of torque of the elastic member, and the distance from $P_1$ to the rotating shaft 20 may increase with an increase in the value of torque of the elastic member. In this way, the position of the rotating shaft 20 may be determined in consideration of the weight m of the parking member 30 and the position of the center of mass G.

The value of torque T converging according to the equation above is theoretically the minimum moment for allowing the parking member 30 to return to its original position, but during actual use, the elastic member may press a lower end portion of the parking member 30 and generate additional moment in the process in which the bicycle is removed. For example, in design of the product, α torsion spring whose value of torque is higher than the value of torque T calculated according to the equation above may be adopted as the elastic member.

The elastic member may have a value of torque that is higher than the value of torque T converging according to the equation above and is within 110% of the value of torque T. By the torsion spring having high torque as described above, it is possible to take preemptive measures against a decrease in the value of torque due to long-term use and prevent the parking member 30 from falling down from the reference position.

The value of torque T which is the moment of the elastic member according to the present disclosure is formed higher than m $(x - x_G)$, and the following equation may be obtained when m, which is the weight mentioned above, is substituted with 13.85, and $x_G$, which is the distance from the first end point to the center of mass, is substituted with 165.

$$13.85(x - 165) < T$$

FIG. 6 is a view for describing a condition in which the bicycle B can be parked in the parking member in consideration of the elastic member. Referring to FIG. 6, α condition in which the bicycle can be parked when the rack 1 for a bicycle or a kick scooter includes the elastic member and rotates to a horizontal state is as follows.

$$F_1 x + m(x - x_G) > T + F_2(L - x) \qquad \text{[Equation 4]}$$

In Equation 4, $F_1$ is the load of the bicycle B that is applied to $P_1$, $F_2$ is the load of the bicycle B that is applied to $P_2$, x is the distance from $P_1$ to the rotating shaft 20, m is the weight of the parking member 30, $x_G$ is the distance from $P_1$ to G, L is the overall length of the parking member 30, and T is the value of torque.

When the variables in the above equation are substituted with respective values, the following equation may be obtained.

$$19.30x + 13.58(x - 165) > T + 24.85(625 - x)$$

Using the convergence value of x obtained through repetition of Equation 3 and Equation 4 above, the position at which the rotating shaft 20 is formed in the parking member 30 may be selected.

FIG. 7 shows convergence plots of the position of the rotating shaft 20 and the moment of the elastic member. As shown in the plots of FIG. 7, as an example, the value of x obtained by substituting the variables in Equation 3 and Equation 4 with respective values may converge to 351.8, and the position of the rotating shaft 20 in FIGS. 4 to 6 may be set to 351.5. Further, as an example, moment M of the elastic member may converge to 2.536 and may be 2,547 Nmm.

According to the present disclosure, as shown in FIGS. 4 to 7, the convergence value of the condition of the elastic member for the parking member 30 to automatically return to its original position after the bicycle is removed and the convergence value of the condition in which the bicycle B can be parked in consideration of the elastic member are used to select the position of the rotating shaft. Further, according to the present disclosure, the center of mass of the parking member 30 is formed between the protruding member 40 and the rotating shaft 20. Accordingly, the rack for a bicycle or a kick scooter according to the present disclosure allows a bicycle to be stably parked and the parking member 30 to rotate to the reference position after the bicycle is removed. However, in the present disclosure, since parking of the bicycle may not be possible in the case in which the value of torque of the elastic member and the value of torque T converging according to Equation 3 above are abnormally high, the value of torque of the elastic member may be limited to be within +10% of the value of torque T obtained by convergence.

Hereinafter, use states of the present disclosure will be described in detail with reference to FIG. 8.

FIG. 8 shows use states of the rack for a bicycle or a kick scooter according to the present disclosure.

Referring to FIG. 8, the present disclosure relates to a single rack allowing either of a bicycle B or a kick scooter K to be parked. FIG. 8A is a view of a state in which the kick scooter K is parked in the rack according to the present disclosure. A shared or personally-owned kick scooter may be stored without a separate additional device. In the present disclosure, since the parking member 30 is tilted about 7° toward a front where the parking member 30 faces the kick scooter K, the kick scooter K may be stably parked without an external force applied thereto. In particular, since the rack according to the present disclosure includes the protruding member 40 formed to protrude from the parking member 30, the kick scooter K parked in the parking member 30 can be prevented from falling or tilting to the left or right and be stably parked, and a locking member (not illustrated) such as a lock may be fastened to the protruding member 40 to store the kick scooter K while preventing theft of the kick scooter K.

According to the present disclosure, as illustrated in FIG. 8B, the bicycle B can also be parked in the rack allowing the kick scooter K to be parked. FIG. 8B is a view of a state in which the bicycle B is parked in the rack according to the present disclosure. The parking member 30 of the rack allowing the kick scooter K to be parked may be rotated to allow the bicycle B to be parked. In the case in which the parking member 30 of the rack 1 for a bicycle or a kick scooter is placed as illustrated in FIG. 8A, the front tire of the bicycle B may be fitted between the pair of parking bars, and a force may be applied toward the front tire of the bicycle B to rotate the parking member 30 to the state illustrated in FIG. 8B and park the bicycle B. Further, according to the present disclosure, by the protruding member 40, the bicycle B can be prevented from falling or tilting to the left or right, and a locking member such as a lock may be fastened to the protruding member 40 to store the bicycle B while preventing theft of the bicycle B. In particular, in the rack 1 for a bicycle or a kick scooter according to the present disclosure, the parking member 30 can be prevented from further rotating counterclockwise after rotating to an angle close to horizontal, and thus the bicycle B can be stably parked. Also, according to the present disclosure, after the bicycle B is removed, the parking member 30 automatically returns to its original position shown in FIG. 8A such that, when the rack 1 is not in use, protrusion of the parking member 30 past the outer sides of the support members 10 is minimized. In this way, space utilization can be improved while the bicycle B is not parked.

Further, in the rack for a bicycle or a kick scooter according to the present disclosure, the convergence value of the condition of the elastic member and the convergence value of the condition in which the bicycle B can be parked in consideration of the elastic member are used to select the position of the rotating shaft, the center of mass is formed between the protruding member 40 and the rotating shaft 20 to allow the bicycle B to be stably parked, and the parking member 30 can return to its original position after the bicycle B is removed.

By the rack 1 for a bicycle or a kick scooter according to the present disclosure, it is possible to address social problems relating to parking, theft, and obstruction of pedestrians' paths that occur due to unauthorized parking of electric kick scooters K. Also, since shared kick scooters K as well as personally-owned electric kick scooters K can be parked, the rack 1 may have increased versatility.

A rack for a bicycle or a kick scooter according to the present disclosure enables both the parking of a bicycle and the parking of a kick scooter and thus can address a problem of low space efficiency of the existing bicycle racks. Also, the present disclosure can address social problems relating to parking, theft, and obstruction of pedestrians' paths that occur due to unauthorized parking of electric kick scooters. Further, the rack according to the present disclosure allows parking of shared kick scooters as well as personally-owned electric kick scooters, and thus the versatility of the rack can be increased.

The embodiments of the present disclosure have been described above with reference to the accompanying drawings, but those of ordinary skill in the art to which the present disclosure pertains should understand that the present disclosure may be carried out in other specific forms without changing the technical spirit or essential features thereof. Therefore, the embodiments described above should be understood as illustrative, instead of limiting, in all aspects.

What is claimed is:

1. A rack for a bicycle or a kick scooter, the rack comprising:
   a pair of support members formed to extend upward from the ground and disposed to be parallel with and spaced apart from each other;
   a rotating shaft coupled to the support members;
   a parking member interposed between the pair of support members and axially coupled to the rotating shaft so as to be rotatable and having an integral U-shaped protruding member; and
   disposed to be spaced apart from a front of the parking member that faces the bicycle or the kick scooter and having both ends bent toward the parking member and fixed to the parking member,
   wherein a center of mass of the parking member is located between the rotating shaft and the protruding member, and
   wherein position of the rotating shaft is calculated based on weight of the parking member and position of the center of mass of the parking member.

2. The rack of claim 1, further comprising an elastic member configured to apply an elastic force to the parking member to allow the parking member to move to a preset reference position.

3. The rack of claim 2, wherein the elastic member has elasticity that allows the parking member to rotate to a preset parking position in a case in which the bicycle is parked in the parking member.

4. The rack of claim 2, wherein the elastic member provides an elastic force to the parking member so that the parking member rotates to the reference position at which the parking member is tilted toward the front from a central axis perpendicular to the ground.

5. The rack of claim 4, wherein the parking member maintains a tilt of 7° toward the front from the central axis due to the elastic member.

6. The rack of claim 1, further comprising a stopper fixed to the rotating shaft to limit a radius of rotation of the parking member.

7. The rack of claim 1, wherein the parking member is formed to have a length in a range of 450 mm to 800 mm.

* * * * *